US000001242H

United States Statutory Invention Registration [19]

[11] Reg. Number: H1242

Moriya et al.

[43] Published: Oct. 5, 1993

[54] SILVER HALIDE PHOTOGRAPHIC LIGHT-SENSITIVE MATERIAL

[75] Inventors: Tomonobu Moriya; Kazuhiro Yoshida, both of Hachioji, Japan

[73] Assignee: Konica Corporation, Tokyo, Japan

[21] Appl. No.: 660,862

[22] Filed: Feb. 26, 1991

[30] Foreign Application Priority Data

Mar. 3, 1990 [JP] Japan ..... 2-52235

[51] Int. Cl.[5] ..... G03C 1/005

[52] U.S. Cl. ..... 430/588; 430/576

[58] Field of Search ..... 430/576, 584, 567, 613, 430/600, 570

[56] References Cited

U.S. PATENT DOCUMENTS 2,751,297 6/1956 Hood et al. ..... 430/602
3,761,266 7/1973 Milton ..... 430/602
4,965,182 10/1990 Mihara .

FOREIGN PATENT DOCUMENTS 0177884 4/1986 European Pat. Off. .

*Primary Examiner*—Robert L. Stoll
*Assistant Examiner*—Joseph D. Anthony
*Attorney, Agent, or Firm*—Finnegan, Henderson, Farabow, Garrett & Dunner

[57] ABSTRACT

A silver halide photographic material which is improved in storage stability comprises a support having thereon a silver halide emulsion layer, wherein said emulsion layer contains at least one of sensitizing dyes represented by the following formula [I-a] and [I-b] and at least one of compounds represented by formula [II]:

formula [I-a]

formula [I-a]

formula [II]

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC LIGHT-SENSITIVE MATERIAL

FIELD OF THE INVENTION

The present invention relates to a silver halide photographic light-sensitive material, more specifically to a silver halide photographic light-sensitive material of which the sensitivity is kept constant without varying by heating or with the passage of time.

BACKGROUND OF THE INVENTION

Recently, there have been growing demands for a silver halide photographic light-sensitive material having a higher sensitivity. To improve sensitivity, sensitizing dyes are commonly employed. Of sensitizing dyes, those represented by the following Formulae [I-a] and/or [I-b] gained experts' attraction since they are highly sensitive to a wavelength region of 700 to 800 nm:

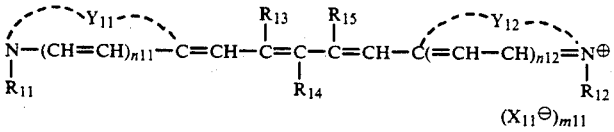

Formula [I-a]

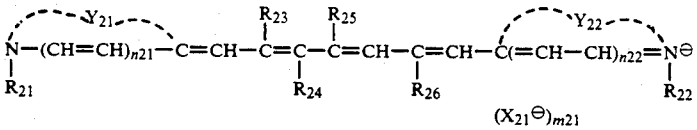

Formula [I-b]

However, it has been found that the use of the above sensitizing dye allows the sensitivity of a light-sensitive material to vary by heating or with the passage of time.

As a result of extensive studies, the inventors have found that the above problem can be solved by the use of a compound represented by Formula [II] in combination with the above sensitizing dye. By the combined use of the sensitizing dye represented by Formula [I-a] and/or [I-b] and the compound represented by Formula [II], it is possible not only to improve sensitivity considerably but also to prevent the fluctuation of sensitivity by heating or with the passage of time.

SUMMARY OF THE INVENTION

The object of the invention is to provide a silver halide photographic light-sensitive material of which the sensitivity is high and does not vary by heating or with the passage of time.

The above object can be attained by a silver halide photographic light-sensitive material having a support and provided on at least one side of said support at least one silver halide emulsion layer, wherein said silver halide emulsion layer contains at least one of sensitizing dyes represented by Formulae [I-a] and [I-b] and at least one of compounds represented by Formula [II]:

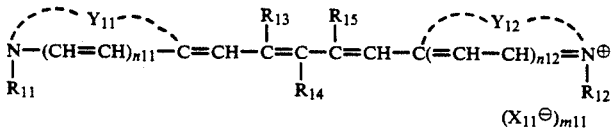

Formula [I-a]

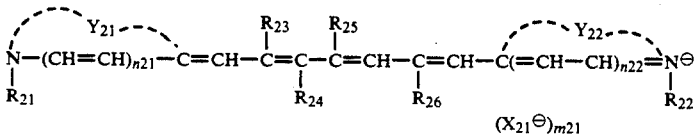

Formula [I-b]

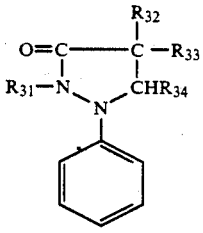

Formula [II]

wherein $Y_{11}$, $Y_{12}$, $Y_{21}$ and $Y_{22}$ each represent a group of nonmetalic atoms necessary for forming a 5- or 6-membered nitrogen-containing heterocycle; $R_{11}$, $R_{12}$, $R_{21}$ and $R_{22}$ each represent a substituted or unsubstituted alkyl group, an aryl group or an aralkyl group; $R_{13}$, $R_{14}$, $R_{15}$, $R_{23}$, $R_{24}$, $R_{25}$ and $R_{26}$ each represent a hydrogen atom, a substituted or unsubstituted alkyl group, an alkoxy group, a phenyl group, a benzyl group or

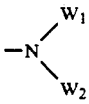

(wherein $W_1$ and $W_2$ each represent a substituted or unsubstituted alkyl group in which the alkyl contains 1 to 18, preferably 1 to 4 carbon atoms, or an aryl group. $W_1$ and $W_2$ may combine with each other to form a 5- or 6-membered ring); $X_{11}$ and $X_{21}$ each represent an anion; $R_{31}$ represents a hydrogen atom or an acetyl group; and $R_{32}$, $R_{33}$, and $R_{34}$ each represent a hydrogen atom or a substituted or unsubstituted alkyl group.

DETAILED DESCRIPTION OF THE INVENTION

The present invention will be described in more detail.

The silver halide photographic light-sensitive material has at least one silver halide emulsion layer. Though the type, crystal habit and grain size of a silver halide employed in this layer are not limitative, studies by the inventors have revealed that satisfactory results can be obtained by providing on a support a silver halide emulsion layer containing silver halide grains with an average grain size of 0.05 to 0.5 μm and a monodispersion degree (explained later) of not more than 20. It is especially preferred that a silver halide in the emulsion layer contain at least 50 mol % of silver chloride. A silver halide light-sensitive material having such emulsion layer is best suited to photographing with a laser beam since it exhibits surprisingly high resolving power when exposed to a laser beam.

The sensitizing dyes represented by Formulae [I-a] and [I-b] will be explained below:

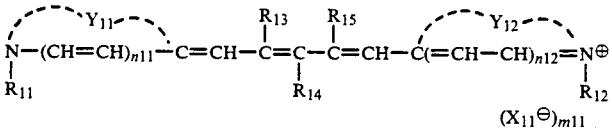

Formula [I-a]

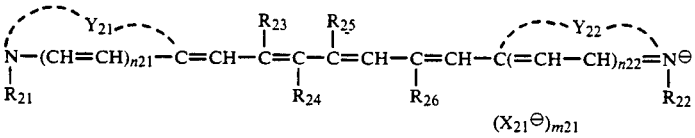

Formula [I-b]

In the above formulae, $Y_{11}$, $Y_{12}$, $Y_{21}$ and $Y_{22}$ each represent a group of nonmetalic atoms necessary for forming a 5- or 6-membered nitrogen-containing heterocycle, such as a benzothiazole ring, a naphthothiazole ring, a benzoselenazole ring, a naphthoselenazole ring, a benzoxazole ring, a naphthoxazole ring, a quinoline ring, a 3,3-dialkylindolenine ring, a benzimidazole ring and a pyridine ring.

These heterocycles may be substituted with a lower alkyl group, an alkoxy group, a hydroxyl group, an aryl group, an alkoxycarbonyl group or a halogen atom.

$R_{11}$, $R_{12}$, $R_{21}$ and $R_{22}$ each represent a substituted or unsubstituted alkyl group, an aryl group or an aralkyl group.

$R_{13}$, $R_{14}$, $R_{15}$, $R_{23}$, $R_{24}$, $R_{25}$ and $R_{26}$ each represent a hydrogen atom, a substituted or unsubstituted alkyl group, an alkoxy group, a phenyl group, a benzyl group or

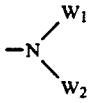

(wherein $W_1$ and $W_2$ each represent a substituted or unsubstituted alkyl group of which the alkyl contains 1 to 18, preferably 1 to 4 carbon atoms, or an aryl group. $W_1$ and $W_2$ may combine with each other to form a 5- or 6-membered nitrogen-containing heterocycle).

A 5- or 6-membered ring may be formed by the linkage of $R_{13}$ and $R_{15}$, or by the linkage of $R_{23}$ and $R_{25}$.

It is preferred that one of $Y_{11}$, $Y_{12}$, $Y_{21}$, $Y_{22}$, $R_{11}$, $R_{12}$, $R_{13}$, $R_{14}$, $R_{15}$, $R_{21}$, $R_{22}$, $R_{23}$, $R_{24}$, $R_{25}$ and $R_{26}$ be an acid group or substituted with an acid group such as carboxyl and sulfo. $X_{11}$ and $X_{21}$ each represent an anion.

When the compound contains an acid group, $m_{11}$ and $m_{21}$ represent 0. In the absence of an acid group, $m_{11}$ and $m_{21}$ are 1. $n_{11}$, $n_{12}$, $n_{21}$ and $n_{22}$ represent 0 or 1.

The specific examples of the sensitizing dye employed in the invention are given below, but they should not be construed as limiting the scope of the invention.

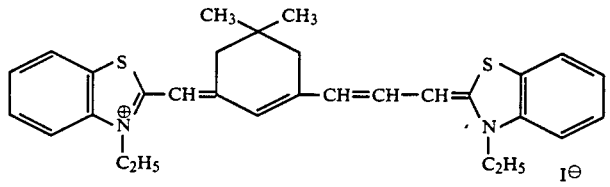

I-1

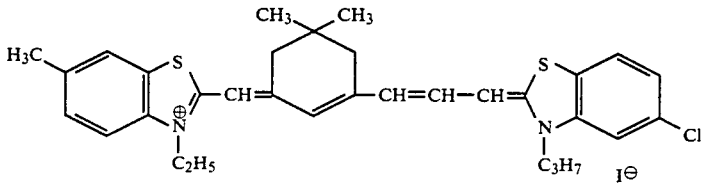

I-2

-continued
I-3
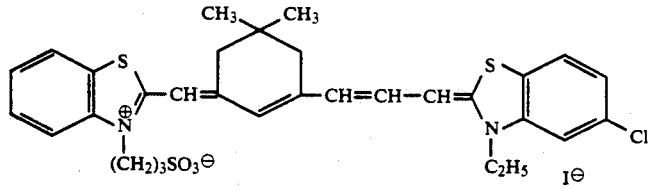
I-4
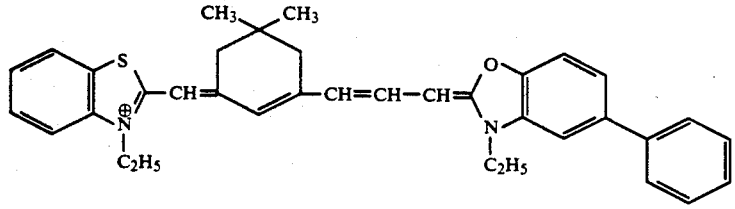
I-5
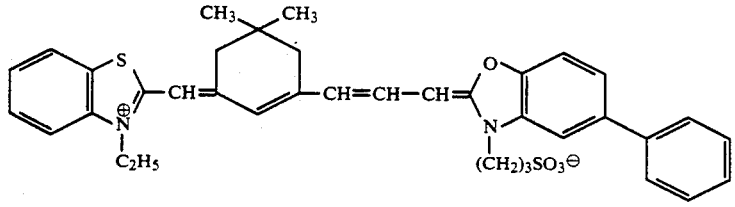
I-6
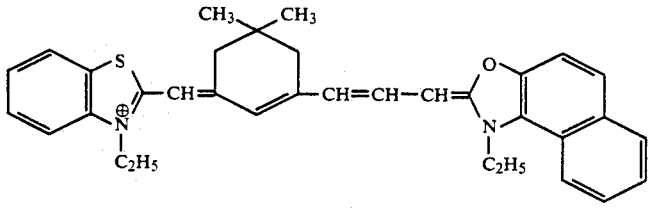
I-7
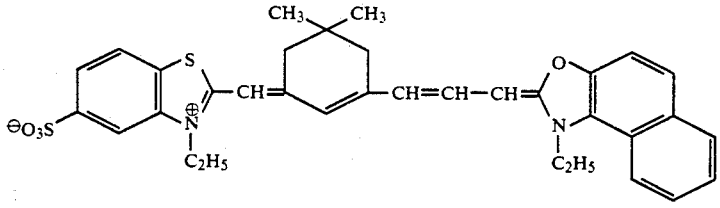
I-8
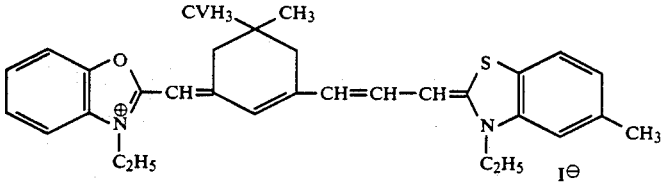
I-9
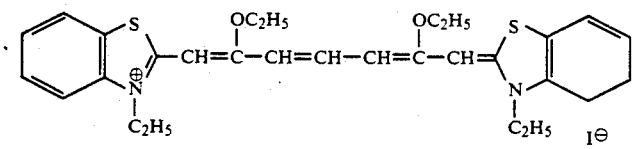

-continued
I-10
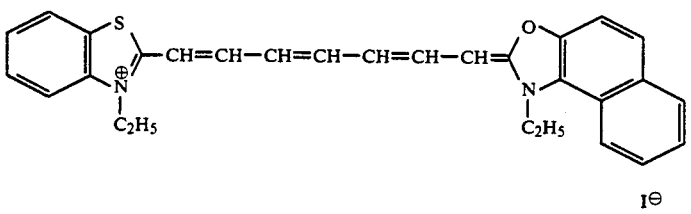
I-11
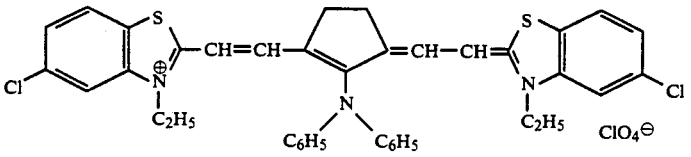
I-12
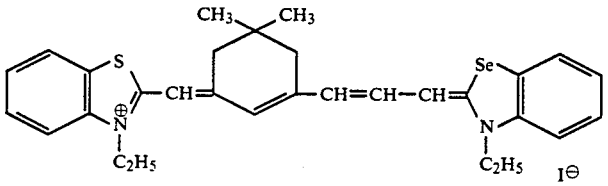
I-13
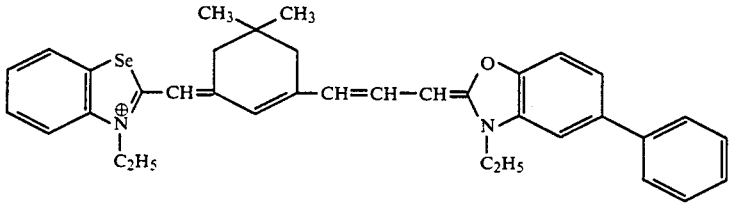
I-14
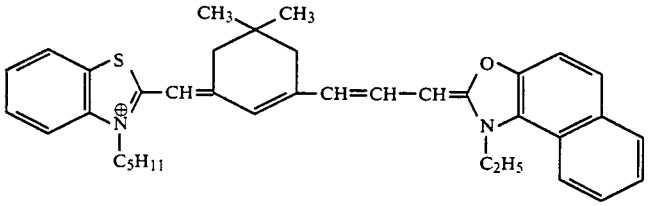
I-15
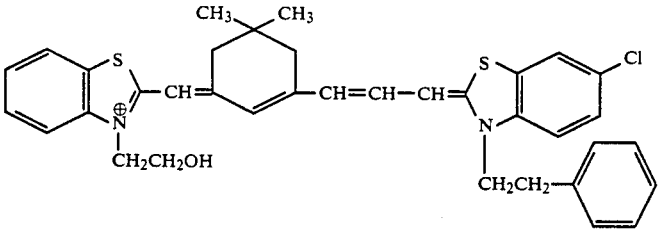
I-16
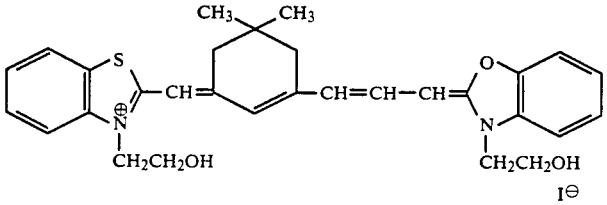

-continued
I-17
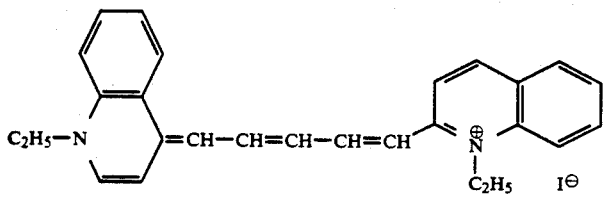
I-18
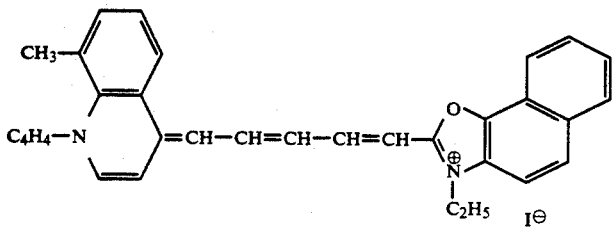
I-19
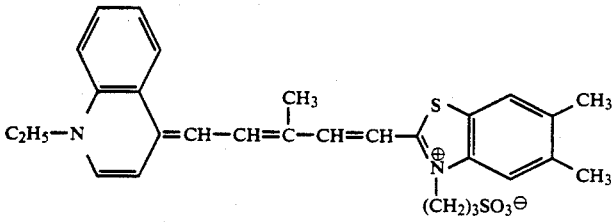
I-20
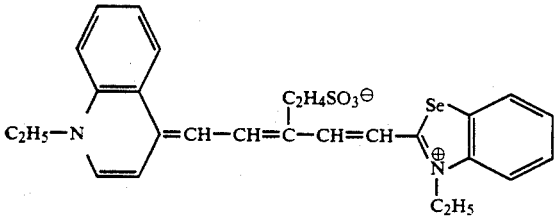
I-21
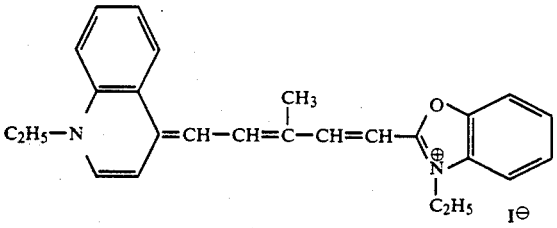
I-22
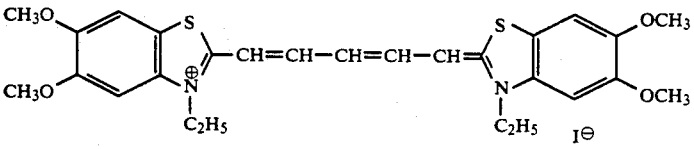
I-23
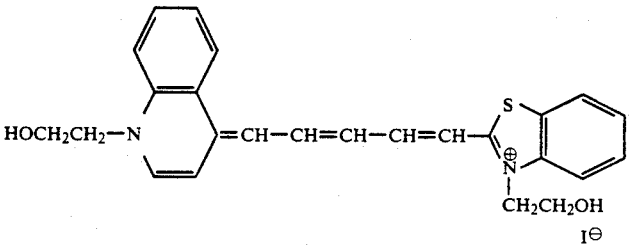

-continued

I-24

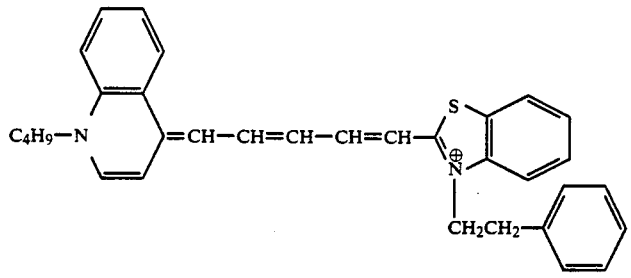

$I^{\ominus}$

The preceding sensitizing dyes are contained in a light-sensitive material preferably in an amount of 1 mg to 2 g, more preferably 5 mg to 1 g, per mol silver.

The preceding sensitizing dyes can be dispersed in an emulsion directly or after being dissolved in a suitable solvent such as methyl alcohol, ethyl alcohol, methyl cellosolve, acetone, water, pyridine and a mixture thereof.

The sensitizing dyes can be employed either singly or in combination. It is also possible to employ other sensitizing dyes than those mentioned above in combination with the preceding sensitizing dyes. When plural sensitizing dyes are used in combination, it is preferred that the total amount of the dyes be in the range specified above.

The preceding sensitizing dyes can be prepared according to method described in U.S. Patent No. 2,503,776, British Patent No. 742112, French Patent No. 2065662 and Japanese Patent Examined Publication No. 2346/1965.

The specific examples of the compound represented by Formula [II] are given below:

II-1: 1-phenyl-3-pyrazolidone
II-2: 1-phenyl-4-methyl-3-pyrazolidone
II-3: 1-phenyl-4,4-dimethyl-3-pyrazolidone
II-4: 1-phenyl-5-methyl-3-pyrazolidone
II-5: 1-phenyl-4-methyl-4'-hydroxymethyl-3-pyrazolidone
II-6: 1-phenyl-4,4-dihydroxymethyl-3-pyrazolidone
II-7: 1-phenyl-4,4-di-n-propyl-3-pyrazolidone
II-8: 1-phenyl-2-acetyl-4,4-dimethyl-3-pyrazolidone The amount of the compound represented by Formula [II] is not limitative, but preferably not more than 10 g per mol silver.

A silver halide employed in the invention may be any of silver bromide, silver iodobromide, silver chlorobromide and silver chloroiodobromide. In respect of contrast property, silver bromochloride or silver iodobromochloride containing at least 50 mol % of silver chloride is preferable. The average grain size of a silver halide is preferably 0.05 to 0.5 μm. That is, the average grain size is preferably not less than 0.05 μm to obtain a higher sensitivity, and not more than 0.5 μm to obtain a practical density.

A photographic emulsion employed in the invention can be prepared by methods described in P. Glafkides, "Chimie et Physique Photographique", Paul Montel, 1967, G.F. Duffin, "Photographic Emulsion Chemistry", The Focal Press, 1966, and V. L. Zelikmanetal, "Making and Coating Photographic Emulsion", The Focal Press, 1964. That is, an emulsion can be prepared by any of the acid method, the neutral method and the ammonia method. A soluble silver salt and a soluble halide salt can be allowed to react by the single-jet precipitation method, the double-jet precipitation method, or the combination of these methods.

In the present invention, it is preferable to employ the acid method and the double-jet method in combination.

It is also possible to employ the reverse precipitation method in which silver halide grains are formed in the presence of an excessive amount of silver ions, or the controlled double-jet method in which the pAg of a liquid phase where silver halide grains are formed is kept constant. By the controlled double-jet method, monodispersed silver halide grains with regular crystal shapes and uniform size distribution can be obtained.

In the invention, the grain size of a silver halide grain is defined as the length of a side in the case of a cubic grain, and as the diameter of a circle having the same area as that of the projected image of a grain in the case of a grain of other shape than cube. The average grain size ($\bar{r}$) is defined as the average value of the grain sizes. The degree of monodispersion can be obtained by multiplying by 100 times a value obtained by dividing the standard deviation for the grain size distribution by the average grain size ($\bar{r}$). In short, the degree of monodispersion can be obtained by the following calculation:

$$\sqrt{\frac{\Sigma (r - \bar{r})^2 ni}{\Sigma ni}} \div \bar{r} \times 100$$

In a preferred embodiment, the degree of monodispersion is not more than 20. A degree of monodispersion exceeding 20 impairs contrast property and sharpness. A monodispersed emulsion having a degree of monodispersion of not more than 20 is especially preferable for use in a light-sensitive material for a He laser, an Ne laser or a He-Ne laser, since it is capable of providing improved dot quality.

Here, contrast property is defined as the degree of density difference between light and dark areas in a photograph. Sharpness is defined as the degree of clearness of the boundary portion as well as detail of an image.

The high intensity exposure property of an emulsion employed in the invention can be improved by the use of a compound containing a metal belonging to the group VIII of the periodic table.

Metals belonging to the group VIII of the periodic table include iron, cobalt, nickel, ruthenium, rhodium, palladium, osmium, iridium and platinum. The examples of preferred compound containing such metal are ferric chloride, potassium ferricyanide, cobalt chloride, cobalt nitrate, luteo salt, nickel chloride, nickel sulfate, ruthenium chloride, ruthenium hydroxide, rhodium chloride, ammonium hexachlororhodate, sodium hexachlororhodate, potassium hexabromorhodate, palladium chloride, palladium nitrate, potassium hexachloropalladate, osmium chloride, iridium chloride ($IrCl_3$ and $IrCl_4$), potassium hexachloroiridate, ammonium hexachloroiridate and potassium hexachloroplatinate.

Gelatin is preferable as the binder employed in silver halide emulsion layers and other hydrophilic colloidal layers constituting the light-sensitive material of the invention. Besides gelatin, also usable are gelatin derivatives, casein, cellulose derivatives such as hydroxymethyl cellulose and cellulose sulfuric acid esters, sugar derivatives such as sodium alginate and starch derivatives, and various synthetic polymers such as polyvinyl alcohol, polyvinyl acetal, poly-N-vinylpyrrolidone, polyacrylic acid, polymethacrylic acid, polyacrylamide, polyvinylimidazole and polyvinylpyrazole.

Usable gelatin include lime-treated gelatin, acid-treated gelatin, oxygen-treated gelatin described in Bull. Soc. Sci. Phot. Japan, No. 16, p 30 (1966), and a product of hydrolytic or oxygen decomposition of gelatin. Usable gelatin derivatives are obtained by a reaction between gelatin and various compounds such as acid halides, acid anhydrides, isocyantes, bromoacetic acid, alkane sultones, vinylsulfone amides, maleic imides, polyalkylene oxides and epoxy compounds.

To avoid fogging during preparation, storage or processing of a light-sensitive material, or to stabilize photographic properties, various compounds may be added to the emulsion layers and hydrophilic colloidal layers of the light-sensitive material of the invention. Such compounds include azoles such as benzothiazolium salts, nitroindazoles, triazoles, benzotriazoles and benzimidazoles (in particular, nitro- or halogen-substituted benzimidazoles); heteromercapto compounds such as mercaptothiazoles, mercaptobenzothiazoles, mercaptobenzimidazoles, mercaptothiadiazoles, mercaptotetrazoles (in particular, 1-phenyl-5-mercaptotetrazole) and mercaptopyrimidines; heterocyclic mercapto compounds containing a water-soluble group such as carboxyl and sulfone; thioketo compounds such as oxazoline thione; azaindenes such as tetrazaindenes (in particular, 4-hydroxy-1,3,3a,7-tetrazaindenes); benzenethiosulfonates; and benzenesulfinic acid.

A silver halide emulsion employed in the invention may contain a polymer latex such as an aqueous dispersion of a homo- or copolymer including methyl acrylate, methyl methacrylate, acrylic acid, methacrylic acid, glycidyl acrylate, styrene, vinyl chloride and vinylidene chloride.

A silver halide emulsion employed in the invention may further contain conventional additives such as chemical sensitizers, stabilizers, toners, hardeners, antifoggants, surfactants, thickeners, plasticizers, lubricants, development retarder, UV absorbers, anti-irradiation agents (dyes), heavy metals and matting agents. These agents can be added by known methods.

A silver halide emulsion can be applied on a suitable support such as a glass plate, a film of cellulose derivative such as cellulose triacetate, a film of synthetic resin such as polyethylene terephthalate, baryta paper, RC paper and synthetic paper. Coating can be performed by conventional methods.

The silver halide light-sensitive material of the invention can be processed by various known methods after exposure.

As the monochromatic developer, use is made of an alkaline solution containing hydroxybenzenes, 1-phenyl-3-pyrazolidones, aminophenols or aminobenzenes as the developing agent, and sulfites, carbonates, bisulfites, bromides or iodides of an alkali metal salt.

EXAMPLES

The present invention will be described in more detail according to the following examples, which should not be construed as limiting the scope of the invention.

EXAMPLE 1

A silver chlorobromide gelatin emulsion containing 35 mol % of silver bromide was prepared by the double-jet method at 45° C. over a period of 100 minutes. After desalting and re-dispersion, there was obtained a monodispersed emulsion having an average grain size of 0.26 μm and a degree of monodispersion of 15, and containing 1.0 mole of silver halide. This emulsion was chemically sensitized at 57° C. for 90 minutes by adding 11 mg of sodium thiosulfate and 14 mg of chloroaurate per mol AgX. The emulsion was then divided into ten pieces. To each piece, the sensitizing dyes represented by Formulae [I-a] and [I-b] and the compound represented by Formula [II] were added in amounts shown in Table 1 to prepare ten specimens. To each specimen, 7 ml of a 0.4% solution of 1-phenyl-5-mercaptotetrazole as the antifoggant, 150 ml of a 1% solution of 6-methyl-4-hydroxy-1,3,3a,7-tetrazaindene as the stabilizer, 10 ml of a 20% aqueous solution of saponin and 16 m±of a 20% solution of hydroquinone, each as the spreader, 7 ml of a 3% aqueous solution of formalin and 0.8 g of sodium 1,3,5-triazine-4-olate, each as the hardener, and 35 g of a latex of ethyl acrylate were added.

Each emulsion was applied on a support such that the silver amount became 4.2 g/m². Simultaneously with the application of the emulsion, an aqueous solution of 500 g inactive gelatin containing 80 ml of 5% formalin, 12 g of amorphous silica (average grain size: 2 μm) and 1.2 g of polymethyl methacrylate (average grain size: 3 μm) was applied on the support such that the amount of gelatin became 0.7 g/m², thus providing a protective layer. The so-obtained ten samples (Sample No. 1 to 10) were each exposed to a semiconductor laser beam of 780 nm in wavelength through a step wedge, followed by developing at ° C. for 12.4 seconds and fixing. The developing was performed with GR-26 (an automatic developer manufactured by Konica Corporation). The developer and fixer employed had the following compositions:

| [Developer] | |
|---|---|
| Water (ion-exchanged water) | about 800 ml |
| Potassium sulfite | 60 g |
| Disodium ethylenediamine tetraacetate | 2 g |
| Potassium hydroxide | 10.5 g |
| 5-Methylbenzotriazole | 150 mg |
| Diethylene glycol | 25 |
| 1-Phenyl-4,4-dimethyl-3-pyrazolidinone | 300 mg |
| 1-Phenyl-5-mercaptotetrazole | 60 mg |
| Potassium bromide | 3.5 g |
| Hydroquinone | 20 g |
| Potassium carbonate | 15 g |
| Compound [α] (shown below) | 25 mg |

Water (ion-exchanged water) was added to make the total quantity 1 l.

Compound [α]

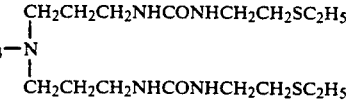

-continued

| | |
|---|---|
| [Fixer] | |
| (Composition A) | |
| Ammonium thiosulfate (72.5% w/v aqueous solution) | 240 ml |
| Sodium sulfite | 17 g |
| Sodium acetate trihydrate | 6.5 g |
| Boric acid | 6 g |
| Sodium citrate dihydrate | 2 g |
| Acetic acid (90% w/w aqueous solution) | 13.6 ml |
| (Composition B) | |
| Water (ion-exchanged water) | 17 ml |
| Sulfuric acid (50% w/w aqueous solution) | 4.7 g |
| Ammonium sulfate (8.1% w/w aqueous solution, as converted to the amount of $Al_2O_3$) | 26.5 g |

The above ingredients A and B were dissolved in sequence in 500 ml of water to make the total quantity of the fixer 1 l.

The pH of the fixer was about 4.3. Each sample was evaluated for sensitivity, and the results obtained are shown in Table 1.

Sensitivity is defined as the reciprocal of an exposure that gives a density of a fog density (unexposed portion) +3.0, and expressed by a value relative to the sensitivity of Sample No. 1 (sensitivity immediately after coating) which is taken as 100. Also sensitivity after aging at 55° C. for 3 days and sensitivity after storage at room temperature for 200 days were measured for each sample.

TABLE 1

| Sample | Dyes I-a and I-b | | Compound II | | Sensitivity | | | |
|---|---|---|---|---|---|---|---|---|
| No. | No. | mg/Agmol | No. | mg/Agmol | S1 | S2 | S3 | |
| 1 | I-6 | 200 | — | — | 100 | 110 | 125 | Comparative |
| 2 | I-5 | 200 | — | — | 95 | 103 | 118 | Comparative |
| 3 | I-6/I-5 | 100/100 | — | — | 110 | 124 | 135 | Comparative |
| 4 | I-6 | 200 | II-1 | 150 | 110 | 112 | 119 | Invention |
| 5 | I-5 | 200 | II-1 | 150 | 104 | 104 | 112 | Invention |
| 6 | I-6/I-5 | 100/100 | II-1 | 150 | 128 | 129 | 134 | Invention |
| 7 | I-6 | 200 | II-4 | 150 | 108 | 108 | 114 | Invention |
| 8 | I-5/I-6 | 100/100 | II-4 | 150 | 125 | 125 | 130 | Invention |
| 9 | I-6 | 200 | II-7 | 150 | 111 | 112 | 116 | Invention |
| 10 | I-5 | 200 | II-7 | 150 | 106 | 106 | 115 | Invention |
| 11 | I-5/I-6 | 100/100 | II-7 | 150 | 124 | 126 | 131 | Invention |

S1: Sensitivity of fresh samples immediately after coating
S2: Sensitivity after 200 day-storage at room temperature
S3: Sensitivity after 3 day-aging at 55° C.

As is evident from Table 1, the sensitivities of the silver halide light-sensitive materials of the invention did not vary a lot with the passage of time or by aging, showing that the light-sensitive material of the invention is improved in the stability of sensitivity to prolonged storage and thermostated aging.

EXAMPLE 2

Sample Nos. 111 to 120 were prepared in substantially the same manner as in the preparation of Sample No. 1, except that the average grain size of a silver halide emulsion was varied to 0.36 μm and that the type and amount of Sensitizing dyes [I-a] and [I-b], and Compound [II] were varied as shown in Table 2. The samples were processed in the same manner as in Example 1, using the same developer and fixer as those employed in Example 1, and evaluated for sensitivity in the same manner as in Example 1. The results obtained are shown in Table 2. Sensitivity was indicated by a value relative to that of a fresh sample of Sample No. 11 that was taken as 100.

TABLE 2

| Sample | Dyes I-a and I-b | | Compound II | | Sensitivity | | | |
|---|---|---|---|---|---|---|---|---|
| No. | No. | mg/Agmol | No. | mg/Agmol | S1 | S2 | S3 | |
| 111 | I-7 | 200 | — | — | 100 | 110 | 121 | Comparative |
| 112 | I-13 | 200 | — | — | 102 | 111 | 123 | Comparative |
| 113 | I-23 | 200 | — | — | 100 | 111 | 121 | Comparative |
| 114 | I-7 | 200 | II-5 | 200 | 110 | 110 | 116 | Invention |
| 115 | I-13 | 200 | II-5 | 200 | 109 | 109 | 116 | Invention |
| 116 | I-23 | 200 | II-5 | 200 | 111 | 112 | 117 | Invention |
| 117 | I-7 | 200 | II-6 | 200 | 110 | 111 | 117 | Invention |
| 118 | I-13 | 200 | II-6 | 200 | 108 | 109 | 116 | Invention |
| 119 | I-23 | 200 | II-6 | 200 | 110 | 112 | 119 | Invention |
| 120 | I-7/I-13 | 100/100 | II-6 | 200 | 112 | 114 | 119 | Invention |

S1: SensitiVity of fresh samples immediately after coating
S2: Sensitivity after 200 day-storage at room temperature
S3: Sensitivity after 3 day-aging at 55° C.

As is evident from Table 2, the sensitivities of the silver halide light-sensitive materials of the invention were high, and did not vary a lot with the passage of time or by heating, showing that the silver halide light-sensitive material of the invention is improved in the stability of sensitivity to prolonged storage and thermostated aging.

What is claimed is:

1. A silver halide photographic light-sensitive material comprising a support having thereon a silver halide emulsion layer, wherein said silver halide emulsion layer contains:

(i) at least one sensitizing dye of the Formula (I-b):

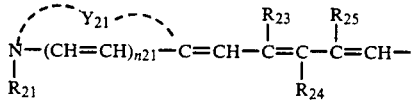

(I-b)

-continued

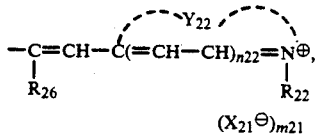

wherein $Y_{21}$ and $Y_{22}$ each independently is a group of nonmetallic atoms forming a 5- or 6-member nitrogen-containing heterocycle; $R_{21}$ and $R_{22}$ each independently is a substituted or unsubstituted alkyl group, an aryl group or an aralkyl group; $R_{23}$, $R_{24}$, $R_{25}$ and $R_{26}$ each independently is a hydrogen atom, a substituted or unsubstituted alkyl group, an alkoxy group, a phenyl group, a benzyl group or

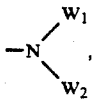

wherein $W_1$ and $W_2$ each independently is a substituted or unsubstituted ($C_1$–$C_{18}$)-alkyl group, or an aryl group and $W_1$ and $W_2$ may combine with each other to form a 5- or 6-membered ring; $X_{21}$ is an anion; and m21, n21 and n22 each independently is 0 or 1; and (ii) at least one compound of the Formula (II):

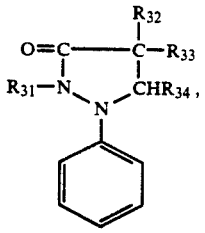

(II)

wherein $R_{31}$ is a hydrogen atom or an acetyl group; and $R_{32}$, $R_{33}$ and $R_{34}$ each independently is a hydrogen atom or a substituted or unsubstituted alkyl group.

2. A silver halide photographic material of claim 1, wherein said silver halide emulsion layer comprises silver halide grains each having a silver chloride content of not less than 50 mol %.

3. A silver halide photographic material of claim 2, wherein said silver halide grains are silver bromochloride or iodobromochloride.

4. A silver halide photographic material of claim 2, wherein the average grain size of said silver halide grains is within the range of 0.05 to 0.5 μm.

5. A silver halide photographic material of claim 2, wherein said silver halide grains are monodispersed and the (grain size standard deviation/average grain size)×100 is not more than 20.

* * * * *